United States Patent [19]

Nakajima

[11] Patent Number: 4,737,814

[45] Date of Patent: Apr. 12, 1988

[54] ELECTRONIC MEMORY MEANS FOR ADJUSTING CAMERA ELECTRIC CIRCUITS

[75] Inventor: Yukio Nakajima, Kanagawa, Japan

[73] Assignee: Olympus Optical Company, Ltd., Tokyo, Japan

[21] Appl. No.: 922,008

[22] Filed: Oct. 22, 1986

[51] Int. Cl.[4] .............................................. G03B 4/097
[52] U.S. Cl. ..................................... 354/412; 354/410
[58] Field of Search ................................ 354/410, 412

[56] References Cited

U.S. PATENT DOCUMENTS

| 4,345,825 | 8/1982 | Matteson et al. | 354/412 X |
| 4,373,810 | 2/1983 | Shreve | 354/412 X |
| 4,427,276 | 1/1984 | Feinerman et al. | 354/412 |
| 4,455,068 | 6/1984 | Izuhara | 354/412 |

Primary Examiner—Michael L. Gellner
Attorney, Agent, or Firm—Louis Weinstein

[57] ABSTRACT

Apparatus for adjusting a camera electric circuit employs a non-volatile memory element for electrically storing and reading data, takes out digitized compensation data from the non-volatile memory element during a digital calculation process, and, after the calculation including the compensation data, controls an exposure control or an exposure display circuit of the camera in accordance with the calculated output, thereby dispensing with conventional analog adjustment. The compensation data may be obtained through the use of a test instrument by comparing test results against results obtained by the camera calculator or through the use of comparing a previously standarized shutter speed with the shutter speed determined by the camera calculator. The compensator value can be used to provide a corrected display. A separate compensation value for an aperture deviation can also be stored. The stored data is retained unchanged by removal of a jumper control.

28 Claims, 5 Drawing Sheets

FIG. 5
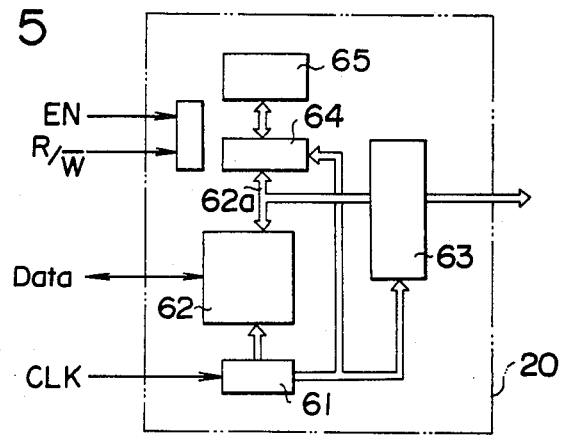
FIG. 6
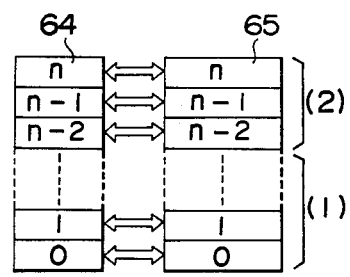
FIG. 7
| R/W \ EN | H | L |
|---|---|---|
| H |  | DATA READ |
| L | DATA STORE IN REGISTER | DATA WRITE IN MEMORY |

ELECTRONIC MEMORY MEANS FOR ADJUSTING CAMERA ELECTRIC CIRCUITS

BACKGROUND OF THE INVENTION

The present invention relates to means for adjusting camera electric circuits, and more particularly, to means for adjusting camera exposure control circuits.

In the past, a method for adjusting camera exposure control circuits or a method for adjusting a camera exposure level, a display level and the like, has been mainly by employing a semifixed resistor (trimmer resistor) or by adjusting an analog quantity with the trimming of a fixed resistor (employing a laser and the like).

An example of such a conventional adjusting means will be described with reference to FIG. 8. A photographing operation with an automatic exposure for a single-lens reflex camera is as follows. Information on brightness of an object being photographed is introduced through a photographing optical system or the like (not shown) into a photometric element 1 and is converted into a photocurrent therein. The photocurrent is further converted into a logarithmically compressed voltage by a photometric circuit comprising an operational amplifier 2 and a compression diode 3. The voltage is compensated in temperature and is adjusted in level by a diode 4 for compensating temperature, a semifixed resistor 5 for adjusting a level and a constant current source 8 and is then fed through an analog multiplexer 9 into an A/D converter 10. An aperture information voltage from a resistor 6 and a film sensitivity information voltage from a resistor 7 are fed through the multiplexer 9 into the A/D converter 10 to be subjected to an A/D conversion. An output from the A/D converter 10 is fed into a calculator 11. The calculator 11 digitally calculates a shutter speed Tv (denoted by the APEX system) for a proper exposure using the following well known equation:

$$Tv = Sv + Bv - Av$$

of the APEX system; where Av is an aperture value, Bv is a brightness value of an object being photographed and Sv is a film sensitivity value. Then, when a release initiate means (not shown) starts to stop down, the calculator 11 counts pulses from a contact piece 12 which slides in cooperation with the stop down operation. When a given number of pulses is reached, the calculator 11 turns a switching element 13 on to allow a magnet 16 for locking an aperture to operate, thereby terminating the stop down operation. Subsequently, upon rise of a movable mirror, a switching element 14 is rendered on to operate a magnet 17 for running a first shutter blind, thereby the first blind starts to run. After a time period calculated above, a switching element 15 is rendered on to operate a magnet 18 for running a second shutter blind, thereby the second blind being released to start running. Thus, the photographing operation is completed.

In the above photographing operation with automatic exposure, values of transmittivity of an optical system in a camera, efficiency of a photosensitive element, current of the constant current source 8, and resistances for setting a film sensitivity and an aperture vary, so that, after an A/D conversion of the values, these converted digital data are:

$$Bv' = Bv + \Delta Bv,$$

$$Av' = Av + \Delta Av, \text{ and}$$

$$Sv' = Sv + \Delta Sv,$$

including errors $\Delta Bv$, $\Delta Av$ and $\Delta Sv$.

To eliminate these errors, a conventional method compensates them by interposing the semifixed resistor 5. Specifically, the Bv value is corrected by a compensation value $\Delta Cv$ and the corrected Bv value is subjected to an A/D conversion. While performing an assembling process, under the condition that a given amount of light is given to a camera, an exposure level is inspected and its deviation from a proper exposure value is compensated by adjusting the semifixed resistor 5. In other words, the calculator 11 actually calculates:

$$Tv = Sv + \Delta Sv + Bv + \Delta Bv - \Delta Cv - (Av + \Delta Av),$$

adjusting $\Delta Cv$ so as to obtain the relation:

$$\Delta Cv = \Delta Sv + \Delta Bv - \Delta Av.$$

In the conventional method of adjusting a semifixed resistor, however, an assembler or inspector reads an output from a circuit by an indicator and adjusts a semifixed resistor to a desired value, so that it is time-consuming, and it is difficult to reduce the cost of parts and assembling and also to automate the adjustment. Although a trimming with a laser or the like can be automated, there are such problems that an apparatus for the trimming becomes a large scale undertaking and readjustment is impossible; specifically it is practicable while electric parts are assembled on a substrate but it is impracticable while they are assembled in a case body of a camera.

Lately an EEPROM (electrically erasable and programmable read only memory) of a small capacity has been developed as a non-volatile digital memory element. The EEPROM is introduced under the item "aiming at a cost reduction by integrating an EEPROM on an analog-digital hybrid CMOS custom IC" in Japanese magazine "Nikkei Electronics", July 1, 1985, page 235, in which it has remarkable effects on an economical advantage because of integrating only a required capacity and a DIP (dual in-line package) switch is replaceable by it. Thus, the EEPROM is suitable for storing operational procedures of instruments or the like and for calibration thereof. Also, it is possible to store and to renew a program. In addition, it is possible to use for trimming an analog circuit. As such, the range of its use is increasing from a digital circuit to an analog circuit.

OBJECT AND SUMMARY OF THE INVENTION

It is an object of the present invention, in order to solve the above problems, to provide a means for adjusting a camera electric circuit which is capable of reducing both the cost and space of the electric circuit by employing a memory element of the above-mentioned non-volatile type.

The adjusting means of the present invention feeds photographing data bearing digital values converted from analog values into the calculator; while calculating based on the digital values, reads digitized compensation data from the non-volatile memory element; and, after a calculating operation regarding the compensation data, controls an exposure control circuit or an exposure display circuit of a camera; thereby dispensing with provision of an analog adjusting circuit. The compensation data are stored by determining an error or difference between a result in control various variation factors of each camera and a proper value or a sequence of measuring an error and storing the compensation data is previously programmed in a calculator.

Consequently, according to the present invention, it is possible to dispense with the provision of conventionally used semifixed resistors for adjustment or to largely reduce the number of parts and the space occupied by the electric circuits and to facilitate an automatic adjustment.

BRIEF DESCRIPTION OF THE DRAWINGS

FIG. 2 is a diagram illustrating a second embodiment of an electric circuit including an adjustment circuit according to the present invention;

FIG. 3 is a time chart of the adjustment circuit shown in FIG. 2;

FIGS. 5 to 7 are detailed diagrams of a non-volatile digital memory element more; particularly, FIG. 5 is a block diagram of its structure, FIG. 6 is a block diagram illustrating memory areas and FIG. 7 is a diagram illustrating an operational relation between EN and R/$\overline{W}$ and FIG. 8 is a diagram illustrating an example of a conventional electric circuit including an adjustment circuit for cameras.

DETAILED DESCRIPTION OF PREFERRED EMBODIMENTS

Figure 8:
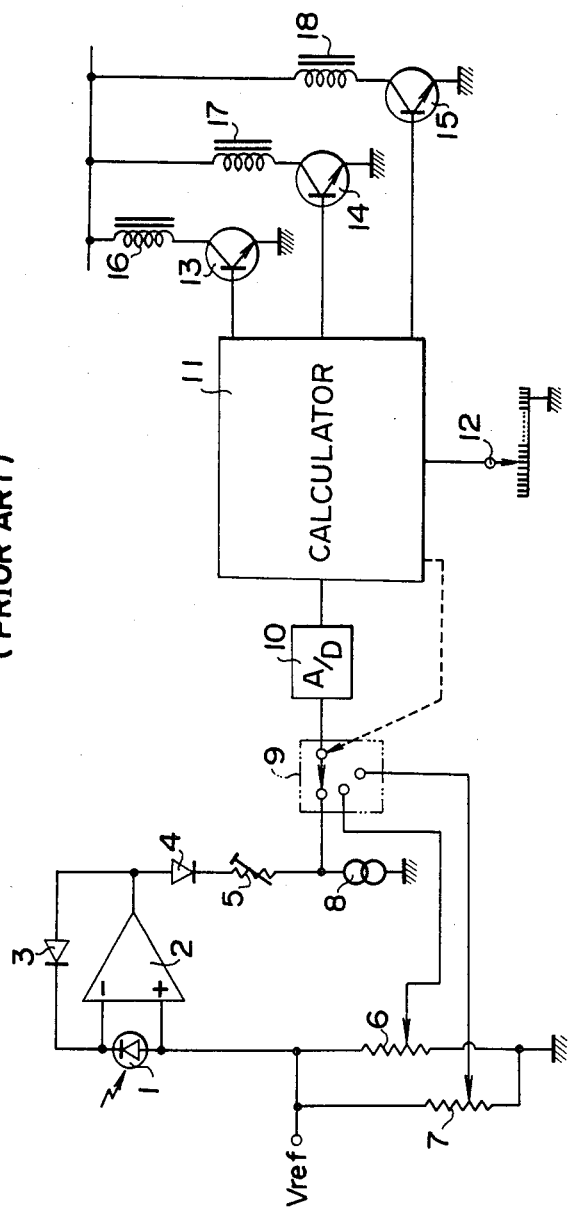

In the following embodiments, only novel structural portions will be described and the description of structural portions similar to those of a conventional apparatus described with reference to FIG. 8 is omitted, leaving only reference numerals in the following embodiments.

The present invention uses a non-volatile memory element described above eliminating the need for a conventional semifixed resistor.

Figure 1:
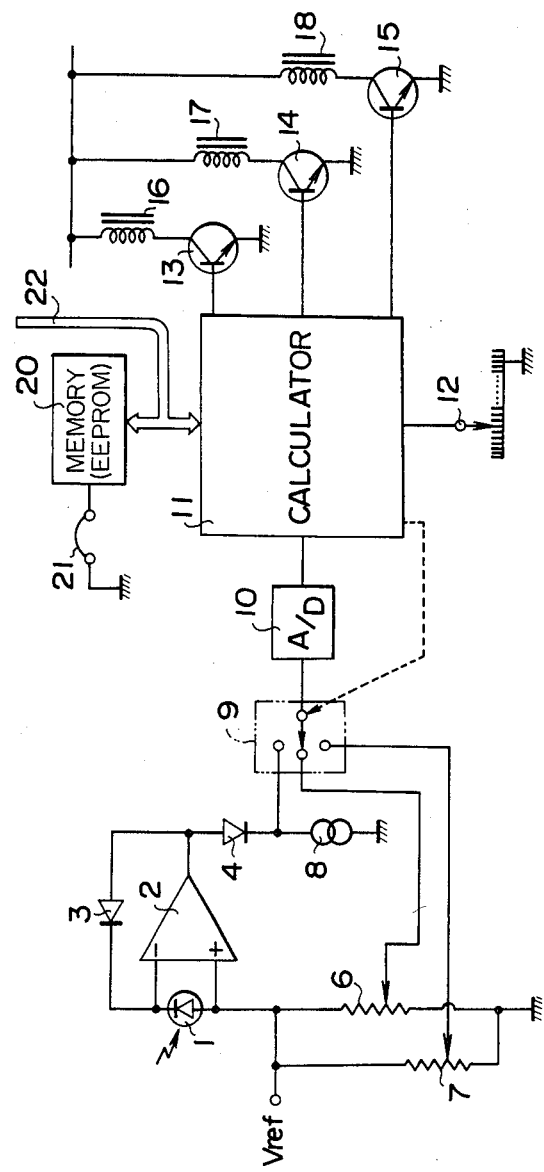
FIG. 1 is a diagram illustrating a first embodiment of an electric circuit including an adjustment circuit for cameras according to the present invention.

In FIG. 1, a non-volatile digital memory element 20 (hereinafter refered to as a memory element) stores data from a data line 22 in its memory area while a jumper 21 is connected. During an assembling process, a given brightness is given to a camera and, under this condition, required data on the basis of a difference between an exposure value measured by a calibrated test instrument and a proper exposure value are stored in the memory element 20 by an entering apparatus (not shown). Assuring that the stored data are correct, the jumper 21 is removed. Thereafter, it is impossible to store further data in the memory element 20 and thus the stored data are not erroneously varied.

Methods for determining storing data and for compensating based on the stored data are as follows. As described above, data after the A/D conversion include respective errors, so that an exposure value deviates from a proper value by $$\Delta Cv = \Delta Sv + \Delta Bv - \Delta Av.$$

Then, digital data corresponding to $\Delta Cv$ are stored in the memory element 20. The calculator 11 reads the data corresponding to $\Delta Cv$ before and after the A/D conversion from the memory element 20 and calculates the following:

$$Tv = Bv' + Sv' - Av' - \Delta Cv.$$

The Tv value thus obtained is $$Tv = Bv + Sv - Av,$$

so that an error is cancelled and a proper shutter speed is determined.

In addition, it is possible to separately compensate an error $\Delta Av$ between an aperture value preset by a resistor 6 for inputting aperture information and an actual aperture value. Specifically, when an aperture value actually controlled is deviated by $\Delta Av$ from the preset aperture value, the number of pulses N corresponding to $\Delta Av$ which are produced at a sliding contact piece 12 is stored in the memory element 20. When $\Delta Av$ is positive (over-stopping), the number of pulses for operating a magnet 16 for locking an aperture may be reduced by N and when $\Delta Av$ is negative, the number of pulses may be added by N.

Figures 2, 3:
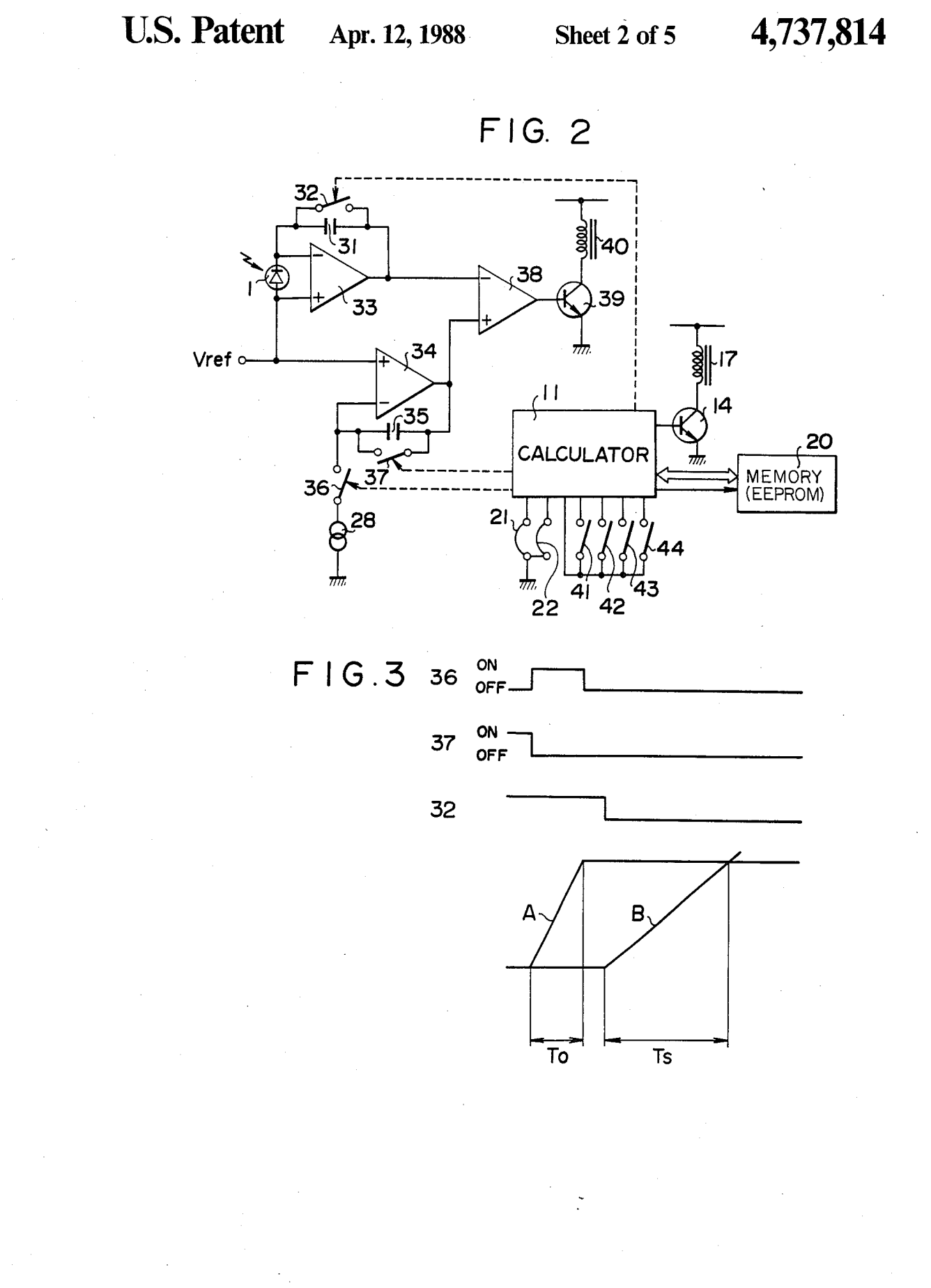

FIG. 2 shows a second embodiment of the present invention which is applied to an exposure control camera of the film surface reflex photometry type. In FIG. 2, a calculator 11 turns a switch 36 on and simultaneously a switch 37 off, prior to an exposure operation. Consequently, a constant current is integrated by a capacitor 35 of a standard voltage integration circuit including a constant current source 28. An output of an operational amplifier 34 rises as shown by a characteristic line A in FIG. 3. After a timer period to corresponding to a film sensitivity, the calculator 11 turns the switch 36 off and thus the integration is completed. Thereafter, the calculator 11 turns a switching element 14 on to energize a magnet 17 for running a first shutter blind, thereby the first blind start to run, and at the same time opens a switch 32 of a photometry circuit. As a result, a photocurrent of a photometric element 1 which receives a light ray reflected by surfaces of the first blind and a film is integrated by a capacitor 31 and an output voltage of an operational amplifier 33 rises as shown with a characteristic line B (FIG. 3). With the lapse of a time period Ts until the characteristic lines A and B cross each other, an output of a comparator 38 becomes a low level L to turn a switching element 39 off. Thereby, a magnet 40 for locking a second shutter blind is deenergized to release the second blind, thereby the second blind starts to run. Thus, the exposure is completed.

Electric contact pieces 41 to 44 read film sensitivity information, that is, a Dx code among pieces of information from a film cartridge.

In operation, a film cartridge including the given film sensitivity information is loaded into a camera and a taking lens having a given diaphragm aperture is mounted on the camera. A light ray of a given brightness is given to the front surface of the taking lens. Under this condition, the camera is exposed to the light ray with a shutter speed Tsa as the adjusting means operates as described above.

On the other hand, the calculator 11 calculates a ratio Ts' between a previously standardized shutter speed Ts and an actual shutter speed Tsa while jumpers 21, 22 are connected. The ratio Ts'=Ts/Tsa is stored in the memory element 20.

With the above procedures, during an actual exposure with the jumpers 21, 22 removed, the calculator 11, prior to an exposure, compensates an integration time to of a capacitor 35 by multiplying Ts', whereby a proper exposure can be achieved.

In addition, when a given value to a different film sensitivity is preset in the same way as before, it is possible to independently compensate for each of a high and a low film sensitivity by removing either of the jumpers 21, 22 while data are stored in the memory element 20. Particularly, in an exposure control circuit of non-compression type, there may be an occasion when trends in exposure error for a low and a high film sensitivity in ISO are different because of effects such as offset of an operational amplifier, in which adjusting based on a film sensitivity is impracticable with a semifixed resistor. At this time, however, the present invention advantageously makes it possible to effect adjustment based on a film sensitivity in ISO.

An essential point in the second embodiment is that, as described in the prior art, as long as there are a lens having a given aperture and a brightness generating means, even without a calibrated test instrument, it is possible to adjust an exposure in a simple way by providing such a spontaneous adjusting program in the calculator 11.

In the case where a diaphragm aperture is compensated as described in the first embodiment, it is also possible to spontaneously store a compensation in the memory element 20 with a combination of the jumpers 21, 22 by programming the number of pulses corresponding to a difference from the number of pulses N defined to a given brightness in the calculator 11.

Such an operation that an operator reads error data in a test instrument with his eyes and effects adjustment by rotating a semifixed resistor for adjustment takes much time and must be repeated since a relation between the errors and an amount of the rotation is indefinite, whereas in the present invention a compensation may be made with one time release of a shutter since a relation between errors and their compensation is distinctly defined.

In addition, as described in the first embodiment, it will be understood that it is possible in the memory system to simultaneously compensate exposure display data not shown.

Figure 4:
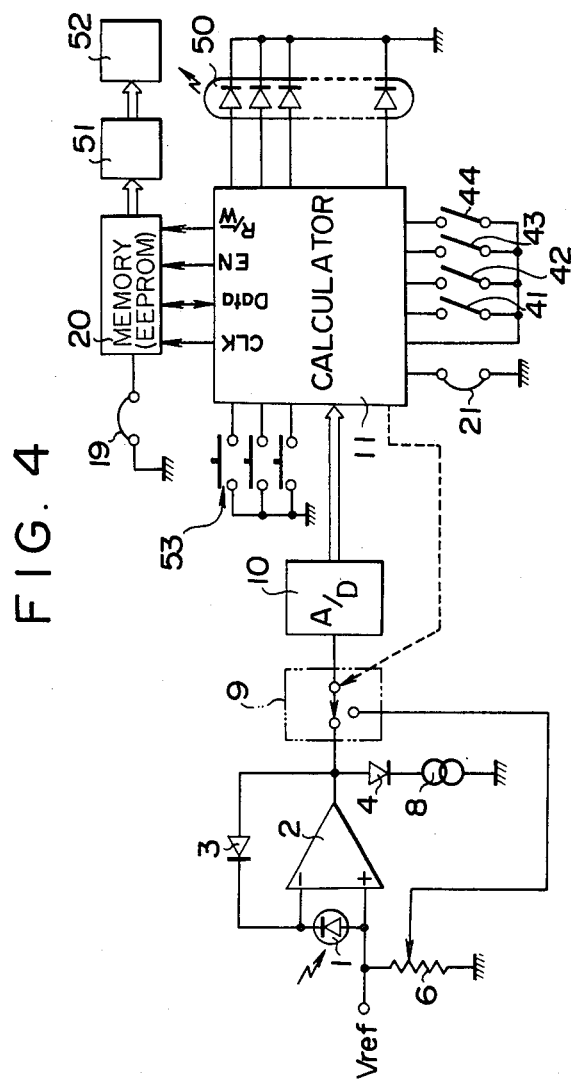
FIG. 4 is a diagram illustrating a third embodiment of an electric circuit including an adjustment circuit according to the present invention.

FIG. 4 shows a third embodiment of the present invention which is applied to an exposure display circuit. In the third embodiment also, as described above, a given brightness, a lens having a given aperture, the number of steps for stopping down and an output to be obtained by an ISO sensitivity which is a given shutter speed display are previously programmed in the calculator 11 and data to compensate a difference between an actual display and a proper display are stored in the memory element 20 by applying the given brightness, the lens having a given aperture and a film sensitivity in ISO to a camera. Then, a jumper 21 is removed. After that, the calculator 11 reads the above compensation value from the memory element 20 in addition to the brightness, aperture, the number of steps for stopping down and the ISO value, and a result of the compensation calculation is displayed on a display element 50.

In FIG. 4, symbols CLK, Data, EN and R/$\overline{\text{W}}$ exhibit a clock signal, a serial signal line, an enable signal to gain access to the memory element 20 and a signal to select storing or reading out data from the memory element 20, respectively.

As such, when data are serially delivered to and received by the memory element 20, it is advantageous that the number of signal lines is greatly reduced.

In addition to the above compensation data, the memory element 20 retains the number of film frames which is preset by a switch 53 and required data to be stored such as an operation mode even when an exhaustion of a battery or while removal of a battery as occasion demands. These data are further displayed on the outside of the camera or within a view finder by a display driver 51 and a display element 52.

FIGS. 5 to 7 show details of the non-volatile digital memory element 20 which is used in the present invention. In the memory element 20, as shown in FIG. 5, a clock signal CLK is delivered to an address control circuit 61, and when either or both of a chip control signal EN and R/$\overline{\text{W}}$ are at the low level L, an address is subjected to increment or decrement by the clock signal CLK. Serial data which are delivered from the Data line in synchronism with the clock signal are converted to parallel data within a serial-parallel converter 62 and are delivered to an internal data bus 62a. The data delivered to the internal data bus 62a are further latched to a display data register 63 which is addressed by an address control circuit 61. After the data display is completed, data such as the number of film frames, ± a compensation amount and a photographing mode are delivered to and converted in parallel by the serial-parallel converter 62 to deliver them to the internal data bus 62a. The data are further latched to a memory register 64 which is addressed by the address control circuit 61.

A normal storing operation is completed as described above. While compensation data are stored the jumpers 19, 21 (FIG. 4) are connected and thereafter the calculator 11 further delivers compensation data which are obtained by a given means to the Data line. Consequently, a compensation value which becomes parallel data by the serial-parallel converter 62 in the same manner as above is latched to the memory register 64 corresponding to a compensation value memory area (2) (n−2 to n) of a non-volatile memory 65, as shown in FIG. 6. Data such as the above-mentioned number of film frames, ± a compensation amount and a photographing mode excepting the compensation data are latched to the register 64 corresponding to a memory area (1) of the memory 65.

When transfer of the data is completed, data on the register 64 are stored in the memory 65, as they are, by turning the R/W̄ and EN lines to the L level by the calculator 11. FIG. 7 shows an operational relation between R/W̄ and EN.

When the jumpers 19, 21 are removed after the compensation value is stored in the memory area (2) as described above, the calculator 11 is unable to store a compensation value and after the jumper 19 is removed, the memory element 20 is also unable to store it in the compensation data area (2). Thereby, an erroneous change of compensation data is prevented.

When a power source is closed, the calculator 11, as occasion demands, turns the EN line to the L level to direct the memory element 20 to transfer data. When the EN line is at the L level, data in the memory 65 are delivered to the register 64 at one time and data in the register 64 are converted in parallel-serial by the serial-parallel converter 62 with increment or decrement of an address in the same way as when storing, to serially deliver them to the Data line. Thus, the non-volatile digital memory element operates.

A means for compensating control by reading out a compensation value stored in the non-volatile memory will be described hereinafter. By way of example, taking a direct value of four bits as compensation data and assuming that two bits of higher orders are integers and two bits of lower orders are decimals, the compensation can be made at intervals of 0.25 within the range of −2.0 through +1.75.

On the other hand, it is possible to use the stored value as an indirect value without using it as a direct compensation value. Specifically, when the compensation requires a multiplication, not an addition and subtraction, there are frequent occasions when a required series is a geometric one. At this time, in order to store a direct value a number of bits (memory capacity) are required. Consequently, in such case each value of four bit data is made to correspond to a value as shown in the following table.

| | |
|---|---|
| F | 1.834 |
| E | 1.681 |
| C | 1.542 |
| . | . |
| . | . |
| . | . |
| 2 | 0.595 |
| 1 | 0.545 |
| 0 | 0.5 |

Then, it is possible to obtain a sufficient accuracy without increasing a capacity of the memory 20 by incorporating the above table into the calculator.

What is claimed is:

1. A camera comprising:
   means for delivering analog data of exposure factors including at least information representing the brightness of an object being photographed;
   an A/D converter for converting the analog data delivered by said analog data delivering means to digital data;
   a calculator which receives said digital data including at least said exposure factors from said A/D converter, for delivering exposure data required for exposure, such as a shutter speed and diaphragm aperture, on the basis of said digital data;
   exposure control means and/or exposure information display means which is controlled by an output of said calculator; and
   a non-volatile digital memory element which is capable of electrically storing compensation data which is given to said calculator;
   said calculator being responsive to a test brightness value which serves as a reference to provide a given exposure value or exposure display value for calculating an optimum compensating value to adjust an exposure value or exposure display value to be controlled which has been calculated by said calculator based upon said test value and exposure data, and storing said value in said digital memory element.

2. Means for adjusting camera electric circuits according to claim 1, in which said non-volatile digital memory element has a function to keep stored necessary data during an exhaustion or a removal of a power source of cameras.

3. A camera according to claim 2 in which said calculator effects a storing operation of the compensating value storing area of said memory element only during the adjusting operation of the camera.

4. Means for adjusting camera electric circuits according to claim 1, in which said non-volatile digital memory element comprises an EEPROM.

5. Means for adjusting camera electric circuits according to claim 1, further comprising a preset program stored in said calculator for spontaneously calculating and storing compensation data for said non-volatile digital memory.

6. Means for adjusting camera electric circuits according to claim 1 wherein said non-volatile digital memory element includes jumper means for permitting the storage of compensation values in said element and for preventing storage of a compensation value when said jumper means is removed.

7. Means for adjusting camera electric circuits according to claim 6, wherein said jumper means is associated with a predetermined memory area of said memory.

8. A camera according to claim 1 in which said calculator is programmed so as to read in stored data from said memory element when a power source of the camera is closed.

9. A camera according to claim 1 in which said compensating value is determined by said test instrument.

10. A camera according to claim 1 in which said compensating value is determined by said calculator.

11. A camera comprising:
means for delivering analog data of exposure factors including at least information representing the brightness of an object being photographed;
an A/D converter for converting the analog data delivered by said analog data delivering means to digital data;
a calculator which receives said digital data including at least said exposure factors from said A/D converter, for delivering exposure data required for exposure, such as a shutter speed and a diaphragm aperture, on the basis of said digital data;
exposure control means and/or exposure information display means which is controlled by an output of said calculator;
a non-volatile digital memory means for electrically storing compensation data which is introduced into said calculator during the calculating process of said calculator so as to make an exposure control value or exposure display control value optimum; and
said memory means including terminal means for enabling data to be stored in said digital memory element only when electrically and externally accessed.

12. A camera comprising:
means for delivering analog data of exposure factors including at least information representing the brightness of an object being photographed;
an A/D converter for converting the analog data delivered by said analog data delivering means to digital data;
a calculator which receives said digital data including at least said exposure factors from said A/D converter, for delivering exposure data required for exposure, such as a shutter speed and diaphragm aperture, on the basis of said digital data;
exposure control means and/or exposure information display means which is controlled by an output of said calculator;
non-volatile digital memory means which is capable of electrically storing compensation data which is given to said calculator;
said memory means including terminal means for enabling transfer of data to the memory means only when said terminal means is accessed; and
said calculator having a built-in program for effecting a first step of obtaining an exposure control value or exposure information display control value by using a given programmed initial value as said compensation data to an adjusting device for producing a brightness which serves as a reference value and is related to a predetermined exposure value or exposure display value, a second step of calculating a compensating value to minimize an error between the control values and said given exposure value or exposure information display value and a third step of storing said compensation value in said digital memory element, when said terminal means is accessed during an assembling process of the camera.

13. A camera comprising:
means for delivering analog data of exposure factors including at least information representing the brightness of an object being photographed;
an A/D converter for converting the analog data delivered by said analog data delivering means to digital data;
a calculator which receives said digital data including at least said exposure factors from said A/D converter, for delivering exposure data required for exposure, such as a shutter speed and a diaphragm aperture, on the basis of said digital data;
exposure control means and/or exposure information display means which is controlled by an output of said calculator;
non-volatile digital memory means which is capable of electrically storing compensation data which is given to said calculator; and
said calculator determining an optimum exposure control value or exposure display value to a measured photometric value by using a compensating value read out from said memory element during the calculation of exposure control value or exposure display control value, and information regarding the number of film frames photographed for displaying the number of frames on the display means being stored in one storing area of said memory means and said compensating value being stored in another storing area of said memory means.

14. A method for operating a camera having means for delivering analog data of exposure factors including at least information on brightness of an object being photographed;
an A/D converter for converting the analog data delivered by said analog data delivering means to digital data;
a calculator for receiving digital data including at least said exposure factors from the A/D converter;
exposure control means coupled to an output of said calculator and non-volatile digital memory means capable of electrically storing data provided to or generated by said calculator, said method including the steps of:
measuring a brightness condition of a predetermined brightness level which is related to a given exposure periods;
detecting the lens aperture and film sensitivity values established at the time of said detection;
calculating an exposure control value based on the aforesaid inputted information;
calculating a compensation value which, when combined with the calculated exposure control value, serves to minimize an error between the control value and the given exposure value; and
storing the calculated compensation value in said memory means.

15. The method of claim 14 wherein said camera further includes terminal means associated with said memory means and being capable of preventing alteration of data in said memory means when in a first state and for enabling data to be altered in said memory means when in a second state, said method further comprising the step of placing said terminal means in said second state to enable storage of said compensation value in said memory means and thereafter moving the terminal means to said first state to retain the stored compensation value in said memory means and to prevent alteration of said compensation value.

16. The method of claim 14 further comprising the steps of performing a photographing operation subsequent to calculation and storage of said compensation value including the steps of detecting the brightness value of the image to be photographed;
   detecting the lens aperture and film sensitivity values existing at the time of measurement of said last mentioned brightness value;
   transferring all of the aforesaid data in digital form to said calculator; and
   calculating an exposure value based on said data and altering the calculated exposure value in accordance with said compensation value stored in said memory means.

17. The method of claim 16 further comprising the step of controlling the camera aperture and shutter to operate in accordance with the calculated compensated exposure value.

18. The method of claim 14 wherein said camera further comprises display means wherein said method further includes the steps of:
   generating a display of the corrected exposure value.

19. The method of claim 18 further comprising the steps of performing a photographing operation subsequent to calculation and storage of said compensation value including the steps of detecting the brightness value of the image to be photographed;
   detecting the lens aperture and film sensitivity values existing at the time of measurment of said last mentioned brightness value;
   transferring all of the aforesaid data in digital form to said calculator; and
   calculating an exposure value bsed on said data and altering the calculated exposure value in accordance with said compensation value stored in said memory means.

20. The method of clam 14 further comprising the step of storing the number of film frames and the camera photographing mode in said memory means for subsequent display.

21. The method of claim 20 wherein said camera further includes terminal means associated with said memory means for enabling alteration of data stored in the predetermined storage area within said memory means when occupying a first state and for preventing alteration of data stored in said predetermined area of said memory means when in a second state and including the steps of operating said terminal means to said first state during the calculation of and prior to the storage of said compensation factor; and
   thereafter operating said terminal means to said second state to prevent alteration of said compensation factor while permitting alteration of data in storage areas of said memory means other than said predetermined storage area.

22. The method of claim 14 wherein a compensation value is calculated and stored for a plurality of different film sensitivities by repeating the method steps of claim 17 for each film sensitivity.

23. The method of claim 14 further comprising the steps of storing an aperture compensation value which, when combined with the detected aperture value, provides an aperture value whose deviation from the preset aperture value is minimized and storing said aperture value in said memory means for use during a photographing operation.

24. The method of claim 23 further comprising the steps of establishing the aperture value upon initiation of a photographing operation including the steps of transferring the aperture value detected by the means for delivering exposure factors to said calculator;
   combining said detected aperture value with the stored aperture correction value stored in said memory means; and
   setting the camera aperture to the corrected aperture value.

25. The method of claim 24 wherein said camera further includes a contact piece associated with the aperture mechanism and slideably engaging a cooperating comb-like member;
   storing said aperture correction value in the form of a number of pulses;
   calculating the aperture value as a number of pulses;
   combining said aperture value and said aperture correction value to yield an altered number of pulses representative of the desired and corrected aperture value; and
   halting the aperture setting operation when the number of pulses detected by said contact piece equals to the corrected number of pulses generated by said calculator.

26. The method of claim 14 wherein said camera further includes sensing means for automatically sensing film sensitivity data from a film cartridge loaded into the camera, said method stpe of inputting film sensitivity information further comprises the step of transferring the data sensed by the sensing means to said calculator.

27. The method of claim 14 further comprising input means for manufally inserting data and wherein said step of introducing data utilized in the calculation of the exposure time correction factor further includes the step of operating said manual means for entry of said data.

28. A method for operating a camera having means for delivering analog data of exposure factors including at least information on brightness of an object being photographed;
   an A/D converter for converting the analog data delivered by said analog data delivering means to digital data;
   a calculator for receiving digital data including at least said exposure factors from the A/D converter;
   exposure control means coupled to an output of said calculator and non-volatile digital memory means capable of electrically storing data provided to or generated by said calculator, said method including the steps of
   providing a predetermined brightness value to the camera enabling said means for delivering said exposure factors to generate information representing said brightness value, which preset brightness value serves as a reference to provide a given exposure value;

detecting the lens aperture and film sensitivity conditions existing at the time said brightness value is detected;

transferring said values to said calculator in digital form;

calculating an exposure value based on said data supplied to said calculator;

comparing the calculated value with the standard value to generate a compensation value, which, when combined with the calculated exposure value, minimizes the error between the calculated value and the standard value; and storing said calculated compensation value in said memory means preparatory to subsequent photographing operations.

* * * * *

UNITED STATES PATENT AND TRADEMARK OFFICE
CERTIFICATE OF CORRECTION

PATENT NO. : 4,737,814
DATED : April 12, 1988
INVENTOR(S) : Yukio Nakajima

It is certified that error appears in the above-identified patent and that said Letters Patent is hereby corrected as shown below:

IN THE ABSTRACT:

Line 15, change "compensator" to --compensation--.

IN THE SPECIFICATION:

Column 4, 7 lines from the bottom, change "start" to --starts--.

Column 5, line 26, change "to" (second occurence) to --To--.

IN THE CLAIMS:

Column 11, Claim 19, line 42, change "bsed" to --based--.

Signed and Sealed this

Second Day of May, 1989

*Attest:*

DONALD J. QUIGG

*Attesting Officer*  *Commissioner of Patents and Trademarks*